"Patented Sept. 28, 1943"

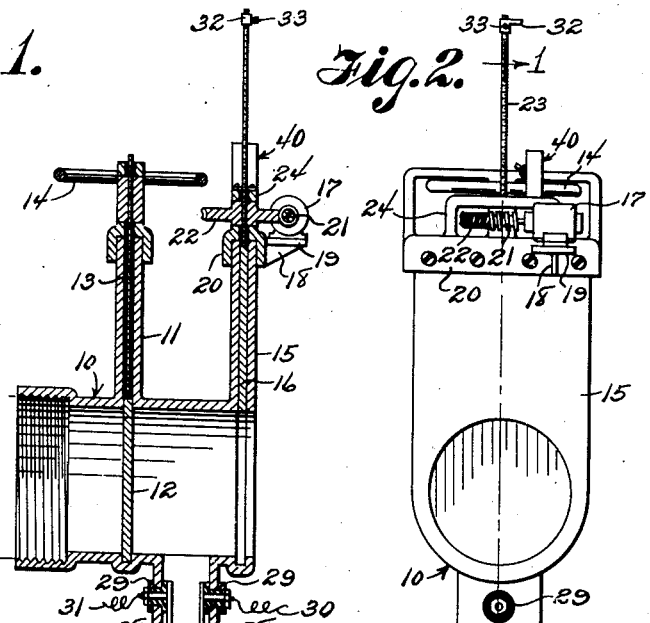

2,330,290

UNITED STATES PATENT OFFICE 2,330,290

VALVE

Harold B. King, Sunbury, Pa.

Application March 14, 1941, Serial No. 383,453

3 Claims. (Cl. 137—144)

This invention relates to valves, and more particularly to valves of the electrically operated type, and has for an object to provide an electrically operated emergency valve for submarine air control, and an electric circuit therefor, so that in the event the air valve sticks or does not close when the submarine submerges, the electrically operated valve will automatically close and prevent the submarine being flooded through a stuck air valve.

A further object is to provide a device of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a longitudinal sectional view of an electrically operated valve constructed in accordance with the invention taken on the line 1—1 of Figure 2.

Figure 2 is a front elevation of the valve and operating means therefor.

Figure 3 is a diagrammatic view showing the electrical connections of the valve in normal position when there is no water in the sump circuit closer.

Figure 4 is a view similar to Figure 3 showing the position of the parts when the sump circuit closer is flooded.

Referring now to the drawing in which like characters of reference designate similar parts in the various views, 10 designates an air valve housing having a vertical casing 11 integral therewith adapted to house a gate valve 12, the valve being moved into and out of the housing to open and closed positions through the medium of a feed screw 13, which is turned by a hand wheel 14. This type of valve may be used for venting the interior of a submarine to the atmosphere when the submarine is on the surface charging the batteries, and is adapted to be closed prior to the submarine submerging and being operated on batteries. The valve of the above type may fail to operate, through sticking or other causes, and to promote safety under such conditions the present invention provides a second guide casing 15 for a gate valve 16 which seals or unseals the valve housing 10.

For operating the auxiliary or emergency gate valve 16, an electric motor 17 is mounted on a bracket 18 which projects from a cap 20, which closes the upper end of the auxiliary guide casing 15, as best shown in Figure 2. The motor shaft is provided with a worm 21 which meshes with a worm wheel 22 having a screw-thread engagement with a feed screw 23, the worm wheel being confined against the cap 20 by a collar 24, best shown in Figure 1. When the motor is actuated, the feed screw 23 will be fed through the worm wheel to close the valve 16.

In further carrying out the invention, a sump 25 is formed on the part of the housing 10 between the valves 12 and 16 and is provided with a drain opening 26 which is closed by a plug 27. A pair of electrodes 28 are secured to, and insulated from, opposite points of the wall of the sump through the medium of bushings 29 of insulating material. Circuit wires 30 and 31 are connected to the electrodes. Should the conventional air valve 12 fail to close, water entering the valve housing 10 will flood the sump 25 and electrically connect the two electrodes 28 to form a circuit closer in the circuit 30—31.

The feed screw 23 of the auxiliary air valve is provided with a laterally extending finger 32, which may be set at adjusted positions on the feed screw by a set screw 33. The finger is adapted to open the motor circuit when the valve 16 has moved to closed position, as will now be described.

The circuit wire 30 is connected to one side of a generator 34, or other source of electricity, the opposite side of the generator being connected by a circuit wire 35 to one side of the motor 17. A circuit wire 36 is connected to the other side of the motor and is connected to a stationary switch contact 37. The wire 31, before mentioned, is connected to a pivoted switch contact 40 and is normally in closed circuit position with the contact 37 to close the circuit from the generator 34 through the motor at this point while the circuit is normally open between the electrodes 28.

When water floods the sump, the motor circuit is closed at the electrodes 28 and may be traced from the generator 34, to the wire 30, across the electrodes 28 in the flooded sump to the wire 31, switch contact 40, switch contact 37, wire 36, motor 17 and wire 35 to the generator. The motor is thus energized to feed the screw downward and close the auxiliary air valve 16. When the auxiliary air valve arrives in closed position, the finger 32 will engage and trip the pivoted switch control 40 to break the motor circuit at this point and stop the motor.

Simultaneously with energizing of the motor when the sump is flooded it is desirable that a relay be energized to control a working circuit for actuating larger relays or devices to close the valves on the ballast tanks and at the same time open the compressed air valves to admit air to the ballast tanks to displace the water in these tanks to float the submerged vessel. For this purpose, one end of the coil 9 of a relay is connected by a wire 41 to the wire 31 leading from the sump electrode to the pivoted switch contact 49. The other end of the coil of the relay is connected to the wire 42 which leads from the generator to one side of the motor. As soon as the motor circuit is closed by flooding of the sump, the relay coil circuit is simultaneously closed and may be traced from the generator 34 to the wire 42, relay coil 9, wire 41, electrodes 28 of the flooded sump and wire 30 to the other side of the generator.

Thus, it will be seen that the relay coil circuit is separate from the motor circuit, that no current can flow through the motor after it has been shut off at the switch contact 37, and that current will continue to flow through the relay coil and energize the relay, when the sump is flooded, to hold the armature contact 43 in circuit closing position with a stationary contact 44, both contacts being in a circuit 45—46, which may be a working circuit to energize larger relays or devices to close the valves on the ballast tanks and admit air to the tanks to float the submerged vessel.

From the above description it is thought that the construction and operation of the invention will be fully understood without further explanation.

What is claimed is:

1. A device of the character described comprising a horizontally disposed submarine inductance tube having a sump forming chamber depending from the bottom portion so as to receive water entering the tube, a valve adapted to close the said tube and spaced from the outlet end thereof, an electrically operated valve mounted at the outlet end of the tube and spaced from the first mentioned valve, and spaced electrodes mounted within the sump having electrical connection with the electrically operated valve so as to close the circuit through the valve and automatically operate the electrically operated valve upon passage of water into the sump.

2. A device of the character described comprising a horizontally disposed submarine air inductance tube, the said tube having a sump forming chamber depending from the bottom portion thereof so as to receive water entering the tube, a valve operable to close the said tube and spaced from the outlet end thereof, a second valve operable to close the tube mounted at the outlet end and spaced from the first mentioned valve, an electric motor for operating the said second valve, and a pair of spaced electrodes mounted within the sump and electrically connected with the said valve operating motor adapted to operate the said second valve to effect closure of the tube upon the passage of water into the sump.

3. In a device of the character described, the combination wih a submarine air inductance tube normally disposed in an approximately horizontal position, of a sump forming chamber depending from the bottom portion of the tube adjacent its outlet so as to receive water entering the tube through said outlet, a control valve mounted on the tube between the outlet and the sump operative to close the tube, an electric motor having connection with the said valve for operating the same, a pair of electrodes supported within the sump, and conductors connecting the said electrodes in circuit with the motor whereby to effect closure of the valve upon the accumulation of a predetermined level of water in the sump from the tube.

HAROLD B. KING.